United States Patent [19]

Long

[11] 3,749,108
[45] July 31, 1973

[54] ADD-ON SLIDE GATE VALVE FOR EXISTING PIPING
[75] Inventor: George M. Long, Hinsdale, Ill.
[73] Assignee: Institute of Gas Technology, Chicago, Ill.
[22] Filed: Apr. 28, 1972
[21] Appl. No.: 248,661

[52] U.S. Cl.................. 137/15, 137/317, 138/94, 29/157.1
[51] Int. Cl........................ B23b 41/08, F16e 41/04
[58] Field of Search..................... 137/15, 317, 318; 138/94, 97, 98; 29/157.1, 213; 251/326, 327

[56] References Cited
UNITED STATES PATENTS
2,913,220  11/1959  Cover .......................... 251/327 X
3,665,953  5/1972  Chronister ..................... 251/327 X Primary Examiner—Martin P. Schwadron
Assistant Examiner—David R. Matthews
Attorney—Jack E. Dominik, Robert E. Knechtel et al.

[57] ABSTRACT

The invention comprises a valve stopper which includes, generally, a rubber patch clamp which is used in combination with a slide gate valve assembly, both of which can be added to an existing fluid piping system without shut-down or interruption of flow. The rubber patch clamp first is affixed to the pipe, and then rubber patch clamp and pipe beneath are sawed through with, for example, a hacksaw or other thin blade or carborundum wire blade. As the blade passes through the compressed rubber patch of the clamp, the rubber tends to close around and behind the blade minimizing fluid leakage from the sawn pipe beneath. The pipe is sawn roughly in half, and the blade then is removed. The slide gate of a slide gate valve assembly is extended from its bonnet, extended partly into the sawn slot in the rubber patch clamp and the pipe beneath. Thereafter, the installation is completed by affixing the entire slide gate valve assembly on the pipe, over the rubber patch clamp.

8 Claims, 9 Drawing Figures

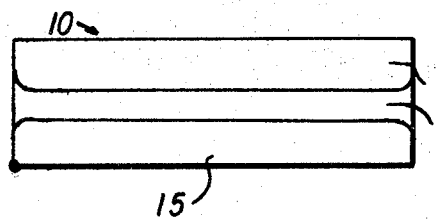
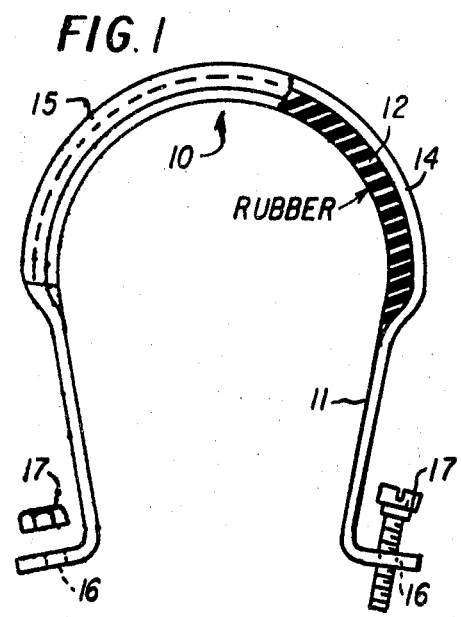
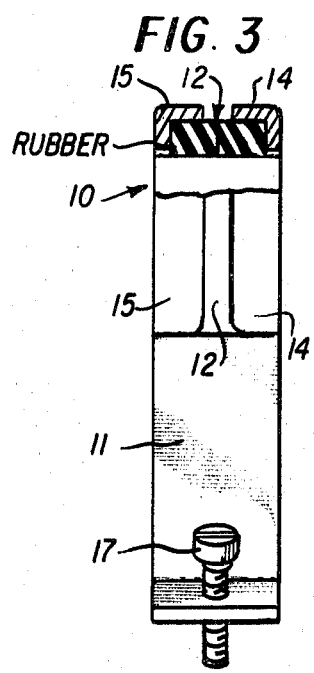
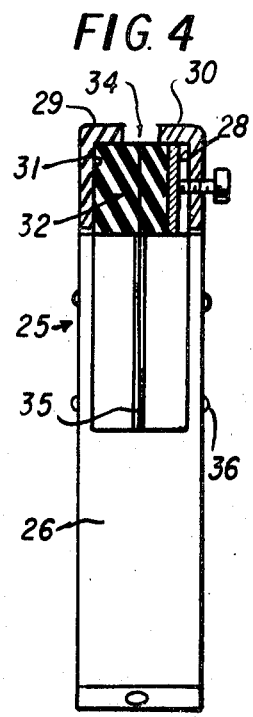
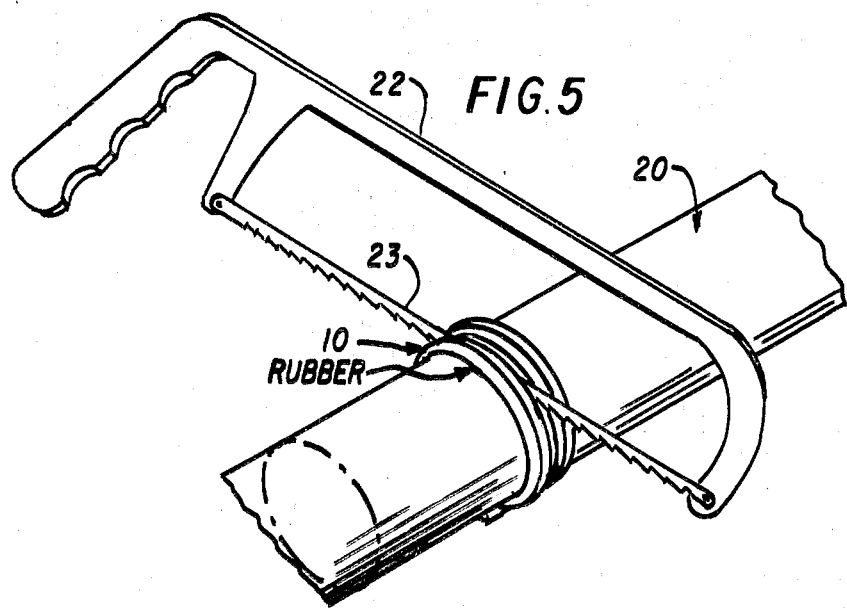

ADD-ON SLIDE GATE VALVE FOR EXISTING PIPING

This invention relates to improved stopper valves of the slide gate type which can be inexpensively added to existing fluid piping systems containing fluids under moderate pressures, without shutdown or interruption of flow during installation.

The slide-gate or stopper valve of the present invention is primarily intended for attachment to existing utility gas distribution systems operating at 25 psig. or less and in sizes 1¼ inch through 4 inch nominal pipe sizes. The pipe material may be steel, cast iron, ductile iron or plastic. The design of the stopper valve permits it to be attached to a fluid carrying pipe under pressure, rather than requiring cut-in of an inline body which is characteristic of other valves. Such cut-in requires isolation of the work section with adjacent valves or stoppers, blow-down and/or drawining to depressurize, purging with inert gases or fluids, or flame control if welding and/or flame cutting is to be done, cut-in and welding or sleeving of the valve and adjacent flanges or pipe sections, repurging with the primary fluid, repressurization and opening of valves or removal of stoppers, and the need for a fluid pipe or hose bypass to maintain service beyond the work section.

There presently exist valves which can stop the flow of fluid in a pipe when "turned off" and restore it when "turned on". These valves, however, normally include an inline body which is designed to be installed during initial construction of a pipe system. If they are to be added to an existing pipe system, a full cut-in of the type described above is required.

There also presently exists leak clamps and sleeves which are adapted to be attached to existing pipe to prevent the escape of leaking gas or liquid from a damaged or corroded pipe. These leak clamps and sleeves are affixed to the pipes, without disturbing the flow of fluid therein.

There also are presently available stoppers which are designed to be affixed to a pipe by welding or clamping and, without leaking the primary fluid, stop its flow temporarily. When installed in pairs, or in conjunction with an existing valve, these stoppers can isolate a section of pipe line for, for example, repair or the cutting in of a valve or tee. The price, complexity and configuration of these stoppers, however, preclude their use as a permanent "valve". The stopper valve of the present invention, on the other hand, combines the function of a valve with the add-on ability of the stopper, at a price and a simplicity comparable to the leak clamp. The stopper valve of the present invention, therefore, greatly simplifies and reduces the time and cost of valve installation. This fact, in turn, makes feasible the installation of more valves in existing systems which would provide at least a two-fold advantage of improving the safety of operations of such existing systems by permitting more rapid shutdown of damaged sections, and improve the quality of service by interrupting the supply to fewer customers via smaller isolated sections.

Accordingly, it is an object of the present invention to provide an improved valve stopper.

More particularly, it is an object to provide improved valve stoppers which can be inexpensively added to existing fluid piping systems containing fluids under moderate pressures, without shutdown or interruption of flow.

Another object is to provide an improved valve stopper and method for affixing it to an existing fluid piping system without shutdown or interruption of the flow in said system.

A still further object is to provide an improved valve stopper which combines the function of a valve with the add-on ability of a stopper at a price and a simplicity compared to a leak clamp.

Other objects of the invention will in part be obvious and will in part appear hereinafter.

The above objectives are accomplished with the valve stopper and method of the present invention which includes, generally, a rubber patch clamp which is used in combination with a slide gate valve assembly, both of which can be added to an existing fluid piping system without shutdown or interruption of flow. The rubber patch clamp first is affixed to the pipe, and then rubber patch clamp and pipe beneath are sawed through with, for example, a hacksaw or other thin blade or carborundum wire blade. As the blade passes through the compressed rubber patch of the clamp, the rubber tends to close around and behind the blade minimizing fluid leakage from the sawn pipe beneath. The pipe is sawn roughly in half, and the blade then is removed. The slide gate of a slide gate valve assembly is extended from its bonnet, extended partly into the sawn slot in the rubber patch clamp and the pipe beneath. Thereafter, the installation is completed by affixing the entire slide gate valve assembly on the pipe, over the rubber patch clamp. If the valve stopper is installed below grade, a valve box is set and the excavation back-filled. The valve box permits the valve stopper to be operated from the surface, by means of a valve key.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which:

FIG. 1 is a side plan view of a rubber patch clamp exemplary of such a rubber patch clamp which can be used with the valve stopper of the present invention;

FIG. 2 is a top plan view of the rubber patch clamp of FIG. 1;

FIG. 3 is an end plan view of the rubber patch clamp of FIG. 1;

FIG. 4 is a similar end plan view of a rubber patch clamp exemplary of an alternate construction which can be used;

FIG. 5 is a perspective view generally illustrating the manner in which the rubber patch clamp is affixed to a pipe, and the latter is sawn to provide a slot therein;

Similar reference characters refer to similar parts throughout the several views of the drawings.

Figure 6:
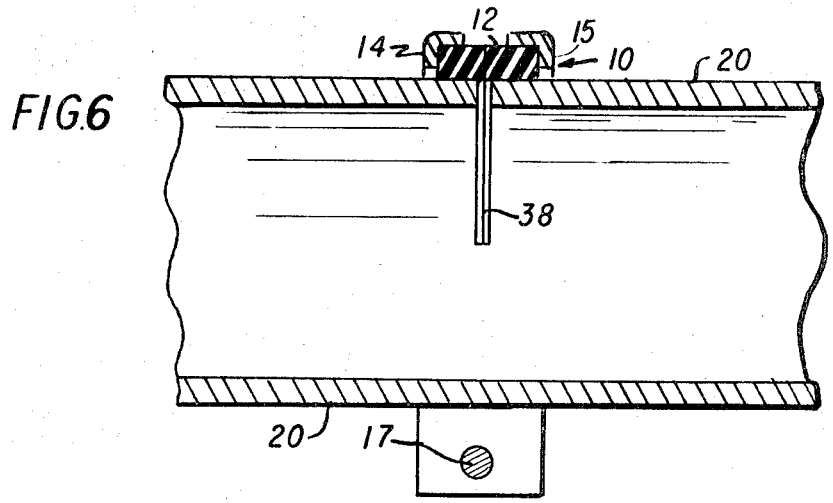
FIG. 6 is a partial sectional view generally illustrating the pipe and the rubber patch clamp after they have been sawn.

Referring now to the drawings, in FIGS. 1–3 there is illustrated a rubber patch clamp 10 exemplary of the type which can be used in combination with a sliding gate valve assembly 40 (FIGS. 7–9) to form the valve stopper of the present invention. The rubber patch clamp 10 includes a clamp portion 11 in the form of an elongated, narrow strip of sheet metal of a length which will permit the rubber patch clamp to be secured tightly about the peripheral surface of a pipe to which the valve stopper is to be affixed. A compressed rubber patch 12 of substantially the same width as the clamp portion 11 is adhesively or otherwise affixed to the clamp portion 11, and is further secured thereon by means of a pair of laterally extending flanges 14 and 15 on the clamp portion 11 which are folded to overlie the rubber patch 12, in the manner which can be best seen in FIGS. 2 and 3. This rubber patch 12 underlies a portion of the clamp portion 11 to extend at least about one half the circumference of the pipe when the rubber patch clamp 10 is affixed to the latter. The terminal ends of the clamp portion 11 have apertures 16 formed therein for receiving a threaded bolt and nut 17 to fixedly secure the rubber patch clamp 10 tightly about a pipe, in the manner illustrated in FIG. 5, wherein the rubber patch clamp 10 is shown secured or clamped about a pipe 20.

After having affixed the rubber patch clamp 10 about the pipe 20, the next step in the method of the present invention for affixing the valve stopper to a pipe is to saw a slot through the rubber patch clamp 10 and the pipe 20 with, for example, a hacksaw 22 or other cutting means having a thin cutting blade such as the hacksaw blade 23, a carborundum blade or the like. If a blade such as the hacksaw blade 23 is used to cut the slot, the blade sides advantageously can be lubricated with glycol or other rubber lubricants to permit the blade to more easily pass through the compressed rubber patch 12, the latter tends to close around and behind the hacksaw blade 23 minimizing fluid leakage from the sawn pipe beneath.

As indicated above, the valve stopper is primarily intended for attachment to existing utility gas distribution systems operating at 25 psig. or less, and in pipe sizes, within a range of 1¼ inch through 4 inches. In such applications, the rubber patch 12, during the time that the slot is sawn into the pipe and after the saw blade is withdrawn is sufficiently resilient and compressible to close the slot to minimize leakage.

In certain applications, particularly with pipes larger than 4 inches in diameter, it may be desirable to use a rubber patch clamp 25 of the construction shown in FIG. 4. This rubber patch clamp 25 is generally of the same construction as the rubber patch clamp 10, however, it features a side follower semi-ring to control the degree of compression of the rubber and its pre-formed slot. This semi-ring is forced against the rubber by setscrews threaded through the side wall 28.

In FIG. 6, a slot 38 is shown cut in the pipe 20 and in the rubber patch clamp 10. The slot 38 extends at least half way through the pipe 20 to permit a sliding gate valve 42 of the sliding gate valve assembly 40 to extend into the pipe 20 to cut off the passage of fluid therein, in the manner described more fully below.

Figures 7, 8:
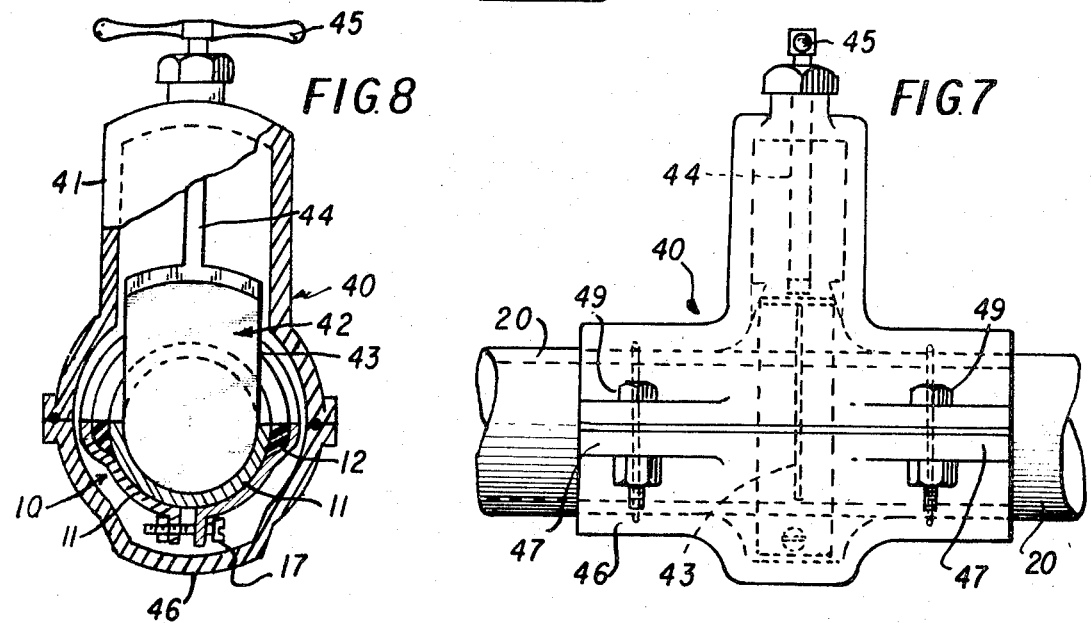
FIG. 7 is a side plan view illustrating the slide gate valve assembly affixed to the pipe, over the rubber patch clamp.
FIG. 8 is an end plan view illustrating the sliding gate valve assembly affixed to the pipe, over the rubber patch clamp.
Figure 9:
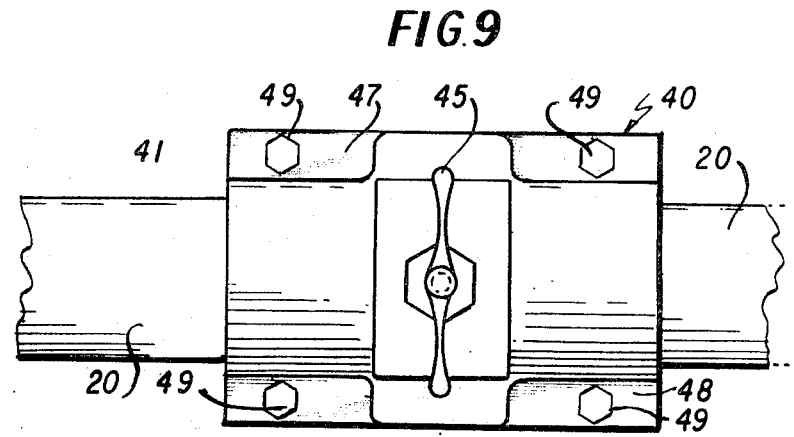
FIG. 9 is a top plan view of the sliding gate valve assembly illustrating the latter affixed to the pipe.

The sliding gate valve assembly 40 is shown in FIGS. 7–9, and it can be seen to include a top or bonnet portion 41 in which is retained the sliding gate valve 42 thereof. The sliding gate valve 42 is in the form of a thin flat gate or blade 43 which is affixed to one end of a stem portion 44 extending through the top of the bonnet portion 41. A handle 45 is affixed to the opposite end of the stem portion 44, for operating the sliding gate valve 42. The sliding gate valve 42 can be of the push-pull or screw-shaft type and, in the case of the larger size valve stoppers and pipe sizes, a screw-shaft type preferably is used. In affixing the sliding gate valve assembly 40 to the pipe 20, the sliding gate valve 42 is extended or lowered sufficiently to permit its end to be inserted into and through the slot sawn in the rubber patch clamp 10 and the pipe 20, when the top or bonnet portion 41 of the valve assembly 40 is seated on the pipe 20. The valve assembly 40 then is securely affixed to the pipe 20 by clamping its lower portion 46 about the underside of the pipe 20, and securing the bonnet portion 41 and the lower portion 46 together by means of fastener means such as the threaded bolts and nuts 49 extended through apertures (not shown) formed in the lateral flanges 47 and 48 on the respective portions thereof.

The sliding gate valve assembly 40 preferably is proportioned to fit over the rubber patch clamp 10 so that the latter is secured therein and it is not necessary to remove it before installing the sliding gate valve assembly 40. The valve assembly 40, of course, fits tightly about the pipe 20 so that its interior is sealed by gaskets or 0-rings to prevent leakage.

If the valve stopper of the present invention is installed on a pipe below grade, a valve box of standard construction is set about it, and the excavation then is back-filled. The valve box permits the valve stopper to be operated from the surface, by use of a properly made valve key which will engage with an operating nut or the like replacing the handle 45 to turn the sliding gate valve 42 or to move it up and down if it is of the push-pull type.

As the sliding gate valve 42 of the sliding gate valve assembly is operated, the sliding gate valve is extended through the slot formed in the rubber patch clamp 10 and the slot 38 formed in the pipe 20, until its terminal end engages the opposite interior surface of the pipe, as can be best seen in FIG. 8. The terminal end of the slide gate valve 42 is contoured to permit it to seat flush against the pipe, to completely block off flow of fluid through the pipe 20.

From the above description, it can be seen that the valve stopper of the present invention can be inexpensively added to an existing fluid piping system without shutdown or interruption of flow. The valve stopper therefore greatly simplifies and reduces the time and cost of valve addition and, this factor makes it feasable to install more valves in existing systems. By installing more valves, the safety of operation of the systems can be greatly improved by permitting more rapid shutdown of damaged sections. Furthermore, with a larger number of valves installed, the quality of service can be improved since the supply to fewer customers will be interrupted, since smaller sections of the system can be isolated.

The stopper valve also can be adapted for automatic operation by certain modifications and the addition of a topworks consisting of a diaphragm, piston or other similar device. The valve then would serve the functions of 1) an emergency shutoff, operated remotely or automatically; 2) a flow limiting restriction similarly operated; or 3) a pressure reducing monitor regulator to be installed ahead of existing pressure regulators to meet current safety requirements.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying drawings shall be interpreted as illustrative and not in a limiting sense.

Now that the invention has been described, what is claimed as new and desired to be secured by Letters Patent is:

1. A valve stopper for use with a pipe containing a fluid under moderate pressure comprising, in combination: a rubber patch clamp secured to and extending about the peripheral surface of said pipe, said rubber patch clamp closing around and behind a thin cutting blade means as the latter is used to cut a slot in said pipe to minimize fluid leakage from said slot, a slide gate valve assembly including a valve top portion supporting a movable slide gate of a thickness and configuration to extend through said slot into said pipe and to block passage of fluid through said pipe when disposed therein and a valve bottom portion, said valve top and bottom portions being formed to permit said movable slide gate to be extended partially into and through said slot to locate said movable slide gate therein and to be clamped together about said pipe with said rubber patch clamp enclosed therein, and means for movably operating said slide gate to extend it through said slot in said pipe to cut off the flow of fluid therein.

2. The valve stopper of claim 1, wherein said rubber patch clamp comprises a sheet metal covered compressed rubber patch clamp.

3. The valve stopper of claim 2, wherein said compressed rubber patch portion of said rubber patch clamp extends about at least one-half the peripheral surface of said pipe, and wherein said slot extends about approximately one-half the peripheral surface of said pipe.

4. The valve stopper of claim 2, wherin said sheet metal covered compressed rubber patch clamp has a pre-sawn slot in the metal portion thereof.

5. The valve stopper of claim 1, wherein said movable slide gate of said slide gate valve assembly comprises a push-pull slide gate.

6. The valve stopper of claim 1, wherein said movable slide gate of said slide gate valve assembly comprises a screw shaft type slide gate.

7. A method of installing a valve stopper on a pipe containing a fluid under moderate pressure comprising the steps of: affixing a rubber patch clamp about said pipe, sawing a slot through said rubber patch clamp and through said pipe, said rubber patch clamp closing around and behind the saw blade and minimizing fluid leakage from the sawn pipe beneath, withdrawing the saw blade from said pipe and said rubber patch clamp, extending the slide gate of a slide gate valve assembly through said slot and partially into said pipe, and securing said slide gate valve assembly about said pipe and said rubber patch clamp, whereby said slide gate can be operated to extend it through said slot and into said pipe to stop the passage of fluid therein.

8. The method of claim 7, further including the steps of setting a valve box about said stopper valve, whereby said stopper valve can be operated from the surface of the ground through said valve box with a valve key, and backfilling about said pipe and valve box.

* * * * *